Sept. 27, 1932. R. W. BURNETT 1,879,977
HAND BRAKE HOLDING AND RELEASING MEANS
Original Filed May 28, 1928
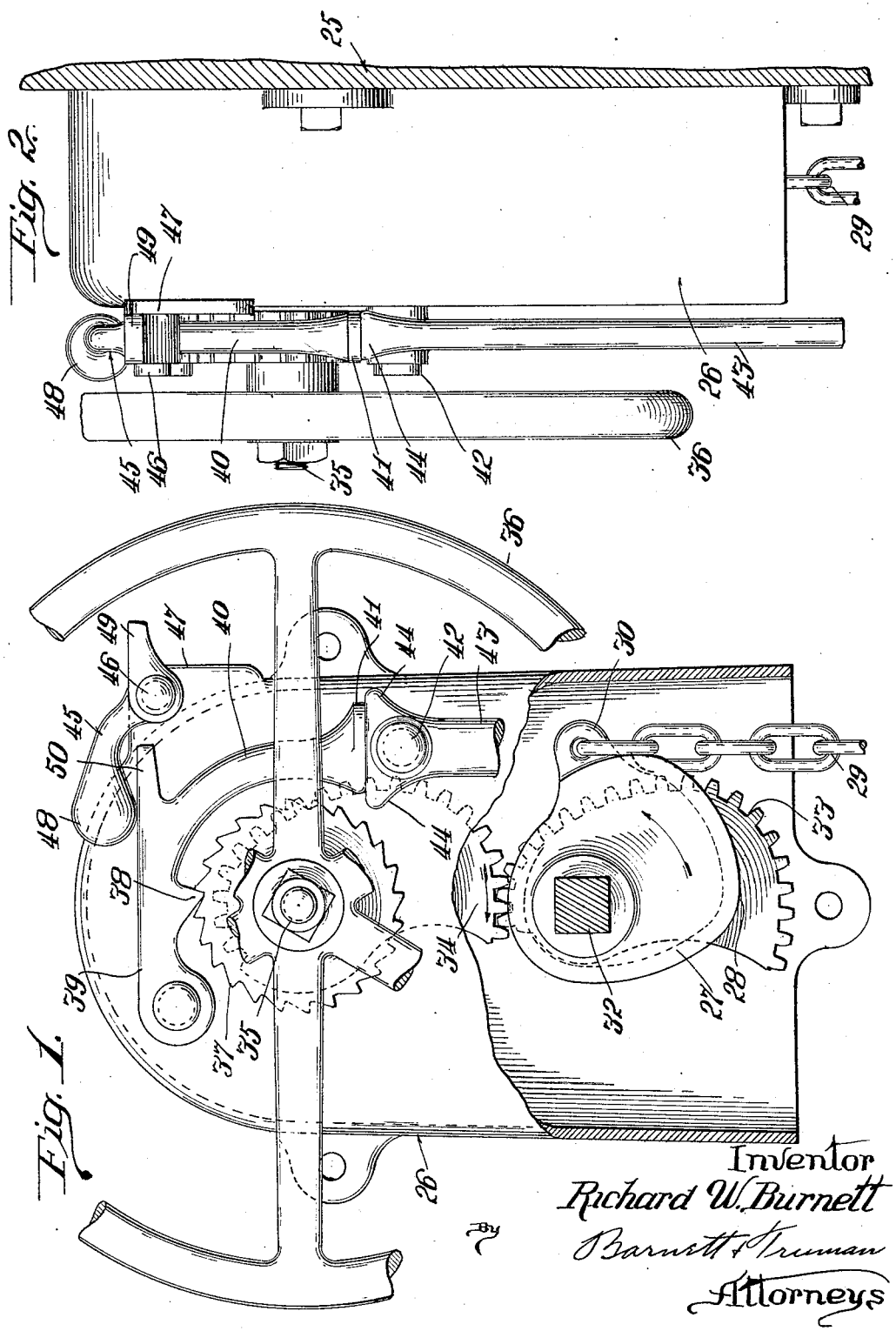

Patented Sept. 27, 1932

1,879,977

UNITED STATES PATENT OFFICE

RICHARD W. BURNETT, OF CHICAGO, ILLINOIS

HAND BRAKE HOLDING AND RELEASING MEANS

Original application filed May 28, 1928, Serial No. 281,088, and in Canada February 13, 1926. Divided and this application filed February 27, 1930. Serial No. 431,761.

This invention relates to hand brake apparatus for railway cars, for example, cars of the freight car class, such as box cars, hopper bottom cars, gondola cars, flat cars and the like, the brake apparatus involving a revoluble drum on which a chain is wound for taking up the slack in the brake rigging and for moving the brake shoes against the wheels of a car with pressure sufficient for retarding or stopping the car or train or holding it on an incline.

The primary object of the invention is to provide an improved mechanism for holding the winding drum in and releasing it from its brake setting position which mechanism will be relatively simple in its construction and consequently cheap in manufacture, which will be strong and durable, consisting of a few strong and durable parts and which can be operated with a minimum amount of effort on the part of the brakeman.

A specific object of the present invention is to provide a hand brake apparatus in which the brake setting and the brake releasing operation may be performed with one hand, thereby permitting the brakeman to use his other hand to hold onto the car.

A further specific object is to provide a holding and releasing mechanism for the winding drum permitting either a complete and instantaneous release of the brakes with a single movement of a controlling element; or a step by step release involving successive engagements of the pawl or other holding device with the ratchet or other elements with which it engages; or a graduated release under the control of the brakeman through manipulation of a hand wheel or other member employed for revolving the winding drum.

A further object is to provide a brake operated with a hand wheel for rotating the winding drum and one or more tripping levers for releasing the brakes, all arranged vertically on the car wall, so as to provide a maximum degree of safety and convenience in the setting and releasing of the brakes and to provide also maximum clearance between the hand wheel of the brake and the adjacent car or between the hand wheel and the maximum side clearance provided for cars on which the brake operating mechanism may be applied to the side wall.

A further object of the invention is to provide holding and releasing mechanism for hand brake apparatus which will permit the release of the brake while the trainman is standing on the ground as well as from the brake platform or end ladder of the car.

The present application is a division of my copending application, Serial No. 281,088, filed May 28, 1928, which was a continuation in part of my application Serial No. 10,248, filed February 19, 1925.

The present application is not concerned with nor limited to the particular type of winding mechanism shown in the copending application No. 281,088, nor to any particular form of brake rigging underneath the car, but is directed to the relation of the parts thereof which are shown but not claimed specifically in said copending application Serial No. 281,088.

By the term "chain" as used in the specification and claims I intend to include any flexible element, such as a cable, capable of being wound on a drum or equivalent winding member; and the term "drum" is used in the broad sense, indicating any revoluble member on which the chain may be wound.

The invention is illustrated in one specific embodiment in the accompanying drawing wherein:

Fig. 1 is an end elevation, with parts in section of the mechanism for winding the operating chain on its drum and for holding and releasing the drum; and Fig. 2 is a side elevation of the mechanism shown in Fig. 1.

25 designates a wall of a railway car. This wall may be the end or side wall and in certain types of cars, for example flat cars, may be considered as any supporting member extending upwardly from the flooring of the car to which the winding mechanism of my improved hand brake is supported. The winding mechanism is enclosed preferably in a housing 26 secured to the vertical wall 25 of the car. The winding mechanism illustrated herein consists preferably of a winding drum 27 formed, preferably, with an arcuate winding surface 28 upon which a chain 29 or other flexible element is wound. The chain 29 is attached to an arm 30 of the winding drum. The other end of the chain 29 may be attached by any suitable means to the brake rigging underneath the car so that a turning movement of the winding drum in one direction will operate said brake rigging to move the brake shoes thereof into frictional engagement with the wheels of the car. The preferably grooved winding surface 28 of the winding drum is of such length that any slack in the brake rigging and in the hand brake apparatus may be taken up and the brake shoes set with braking pressure against the wheels of the car by movement of the drum 27 less than one revolution. The drum 27 is secured on the same shaft 32 with an eccentric gear 33 which latter meshes with an eccentric gear 34 on a hand wheel shaft 35. The hand wheel shaft 35 projects outside the housing 26 and carries at its end a hand operating wheel 36. The wheel, it will be noted from Figs. 1 and 2, operates about a horizontal axis so that the periphery of the wheel will rotate in a vertical plane. It will be seen that by rotating the hand wheel 36 in a clockwise direction with reference to Fig. 1, the inter-meshing of the gears 33 and 34 will impart a rapid winding movement to the drum 27 during the initial operation of the hand wheel. This initial operation serves to take up any slack in the brake rigging underneath the car and in the brake operating mechanism. Continued movement of the winding mechanism brings the larger radius of the gear 33 into engagement with the small radius of the gear 34 thereby providing for the application of maximum power after the slack has been removed. In addition to the eccentric construction of the inter-meshing gears 33 and 34, the winding drum itself is of an eccentric configuration so that the maximum of power is applied after the initial take-up of slack has been completed.

In order to hold the drum 27 against reverse movement during the winding operation, I provide a ratchet wheel 37 engaged by a tooth 38 of pawl 39. The ratchet wheel 37 is preferably secured to the hand wheel shaft 35 in a position between the hand wheel and the front face of the housing 26 and the pawl 39 is pivoted in a position above the ratchet gear so that the tooth 38 will normally be moved into engagement with the teeth of the ratchet wheel by the action of gravity. The tooth end of the pawl is preferably formed with an arcuate extension 40 terminating in a foot-piece 41. Pivoted to the housing at 42, below the foot-piece of the pawl, is an operating rod 43 which may be of any suitable length, and having cam shoulders 44—44 adapted to engage the foot-piece of the pawl and force the pawl out of engagement with the ratchet 37. Operating rod 43 may be swung in either direction, right or left, to accomplish this result. After releasing the ratchet 37, by use of the lever 43, the lever can be returned quickly to its vertical position so as to permit the tooth 38 of the pawl to again reengage the ratchet 37. Repeated operations of this character result in a notching off release of the brake. In addition to the tripping lever 43 I provide also a tripping lever 45 pivoted at 46 to a bracket 47 on the housing. The weighted end 48 of the lever 45 normally bears upon the upper surface of the pawl 39 so as to provide additional weight for returning it to its ratchet engaging position.

The tripping lever 45 is also provided with a tail-piece 49 adapted to engage the under side of the projection 50 of the pawl. The projection 50 is preferably positioned intermediate the foot 41 and the pivotal axis of the pawl and also at a substantial distance from the said pivotal axis. When the weighted end 48 of the lever 45 is turned to a position whereby the tail 49 will bear against the projection 50 of the pawl, the weighted end of the lever exerts pressure upwardly against the pawl tending to lift it out of its engagement with the ratchet 37. As soon as the pressure of the ratchet against the tooth 38 of the pawl is relieved, for example by imparting a turning movement to the hand wheel in a direction to set the brakes or by manipulation of the trip lever 43, the weight of the lever 45 will lift the pawl out of and hold it clear of the teeth of the ratchet 37. If this disengagement of the pawl is effected through manipulation of the trip lever 43, the braking pressure is released instantaneously but if it is effected through the operation of the hand wheel the brakeman may effect a graduated release by holding onto the wheel and permitting it to revolve slowly. If the brakeman is within reach of the tripping lever 45 instantaneous release may be effected by exerting sufficient pressure on the said lever to cause the disengagement of the tooth 38 with the teeth of the ratchet wheel. In this connection it will be noted from the drawing and the description heretofore that the lever 45 may be used independently of the lever 43 or in conjunction with said lever as may be desired and that the levers in both cases engage the weighted end of the pawl.

I claim:

1. Means for holding the hand power mechanism of a railway car hand brake in and releasing it from its brake setting position comprising a ratchet wheel fixed to a moving part of said mechanism, a pivoted pawl having a tooth for engaging said ratchet and formed at its toothed end with a weighted portion for normally holding it in engagement with the ratchet, and a vertically disposed pivoted rod having a cam surface for engagement with the weighted end of said pawl to lift the pawl out of its holding position.

2. Means for holding the hand power mechanism of a railway car hand brake in and releasing it from its brake setting position comprising a ratchet wheel fixed to a moving part of said mechanism, a pivoted pawl engaging said ratchet and formed with a weighted end for normally holding it in its engagement with the ratchet, and a vertically disposed pivoted rod having a cam surface for engagement with the weighted end of said pawl and operable by a swinging movement of the rod to either side of the vertical center of its pivotal axis to lift the pawl out of its holding position.

3. Means for holding the hand power mechanism of a railway car hand brake in and releasing it from its brake setting position comprising a ratchet wheel fixed to a moving part of said mechanism, a pivoted pawl having a tooth engaging said ratchet and formed at its toothed end with a weighted portion for normally holding it in engagement with the ratchet, and a releasing lever pivoted near its upper end so as to normally assume a vertical position and having a cam surface for engagement with the weighted end of said pawl to lift the pawl out of its holding position.

4. Means for holding the hand power mechanism of a railway car hand brake in and releasing it from its brake setting position comprising a ratchet wheel fixed to a moving part of said mechanism, a pivoted pawl having a tooth engaging said ratchet, and formed with a weighted end for normally holding it in engagement with the ratchet, and a releasing lever operable by a trainman while standing on the ground, the lever being pivoted near its upper end so as to normally assume a substantially vertical position and formed near said pivot with a cam surface for engagement with the weighted end of said pawl and operable by a swinging movement of the lever to lift the pawl out of its holding position.

5. Means for holding the hand power mechanism of a railway car hand brake in and releasing it from its brake setting position comprising a ratchet wheel fixed to a moving part of said mechanism, a pivoted pawl horizontally disposed to engage said ratchet and provided with an extension at one side of its pivot and two releasing levers pivoted to engage said pawl extension and either of which is operable to lift the pawl out of its holding position; one of said levers being pivoted near its upper end and extending downwardly so as to be operable by a trainman standing on the ground, the other of said levers being adapted to be positioned to bear upwardly on said extension, whereby the weight of said second lever will automatically move the pawl to and support it in its released position upon an initial releasing movement of the first mentioned lever.

6. Means for holding the hand power mechanism of a railway car hand brake in and releasing it from its brake setting position comprising a ratchet wheel fixed to a moving part of said mechanism, a pawl horizontally disposed and having a toothed end for engagement with said ratchet, and two releasing levers pivoted to engage said toothed end of the pawl and either of which is operable to lift the pawl out of its holding position; one of said levers being pivoted near its upper end and extending downwardly so as to be operable by a trainman standing on the ground, the other of said levers being adapted to be positioned to bear downwardly on the pawl to hold it in its engagement with the ratchet and when in another position to exert pressure upwardly on said toothed end of the pawl, whereby the weight of said second lever when in the last named position will automatically move the pawl to and support it in its released position upon an initial releasing movement of the first mentioned lever.

7. Holding and releasing means for the hand power mechanism of railway car hand brakes comprising a ratchet fixed to a moving part of the power mechanism, a pivoted pawl having a toothed end for engagement with said ratchet, and means for moving the pawl out of its holding position comprising a normally vertically disposed operating rod pivoted near its upper end and provided near its pivotal axis with a cam portion for engagement with the said toothed end of said pawl.

RICHARD W. BURNETT.

CERTIFICATE OF CORRECTION.

Patent No. 1,879,977.                                  September 27, 1932.

RICHARD W. BURNETT.

It is hereby certified that error appears in the printed specification of the above numbered patent requiring correction as follows: Page 3, line 38, claim 4, strike out the words "with a weighted end" and insert instead at its toothed end with a weighted portion; and that the said Letters Patent should be read with this correction therein that the same may conform to the record of the case in the Patent Office.

Signed and sealed this 29th day of November, A. D. 1932.

(Seal)

M. J. Moore,
Acting Commissioner of Patents.